Figure 1:
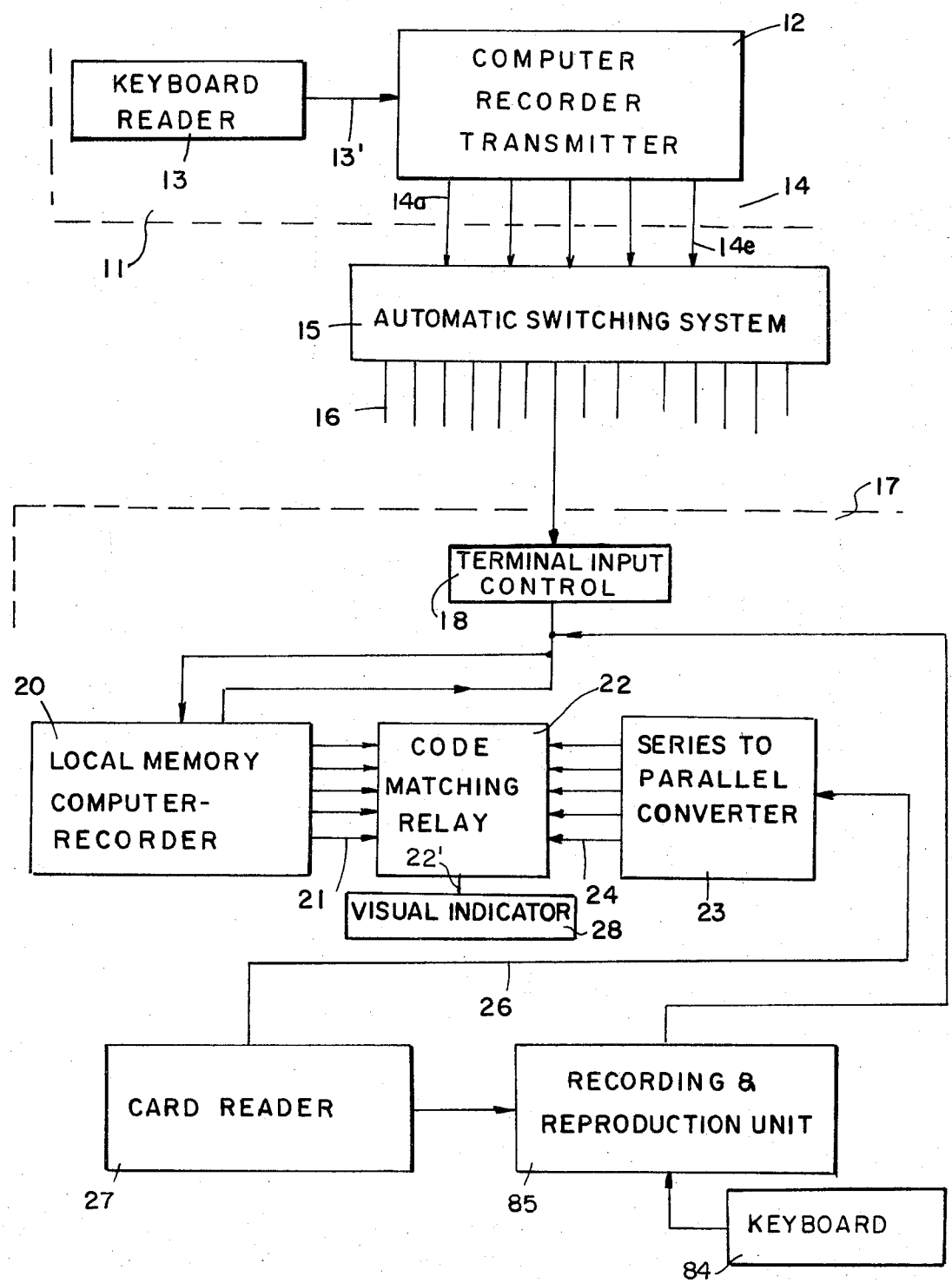

United States Patent

Lemelson

[15] 3,696,335
[45] Oct. 3, 1972

[54] CREDIT VERIFICATION SYSTEM

[72] Inventor: Jerome H. Lemelson, 85 Rector St., Metuchen, N.J. 08840

[22] Filed: April 21, 1970

[21] Appl. No.: 30,450

Related U.S. Application Data

[63] Continuation-in-part of Ser. No. 311,252, Sept. 24, 1963, Pat. No. 3,511,940, which is a continuation-in-part of Ser. No. 685,692, Sept. 23, 1957, Pat. No. 3,106,612, and a continuation-in-part of Ser. No. 417,386, Dec. 10, 1964, Pat. No. 3,434,130, which is a continuation-in-part of Ser. No. 142,748, Aug. 28, 1961.

[52] U.S. Cl. .........340/149 A, 179/2 CA, 235/61.7 B
[51] Int. Cl. ............................G06f 7/04, H04q 5/02
[58] Field of Search........340/149, 149 A, 152; 179/2 CA; 235/61.7 B

[56] References Cited

UNITED STATES PATENTS

| | | |
|---|---|---|
| 3,308,238 | 3/1967 | Brothman et al. ......340/152 X |
| 3,394,246 | 7/1968 | Goldman ...........340/149 A X |
| 3,465,289 | 9/1969 | Klein ..........................340/149 |
| 3,445,633 | 5/1969 | Ratner ..................235/61.7 B |
| 3,544,769 | 12/1970 | Hedin .....................340/149 X |
| 3,559,175 | 1/1971 | Pomeroy ....................340/152 |
| 3,588,449 | 6/1971 | Paterson ............340/149 A X |

*Primary Examiner*—Donald J. Yusko

[57] ABSTRACT

A credit verification system employing cards such as credit cards, and means for automatically determining if an account represented by a card is of acceptable credit. In one form, information recorded on the card which identifies the account, is read after inserting the card into a reader and is compared with locally recorded information to determine if the account is acceptable for effecting the transaction. Upon generation of an indication that the credit standing of the account is acceptable or verified, the card may be used to complete the transaction in a printer which prints information recorded on the card onto one or more transaction slips.

11 Claims, 3 Drawing Figures

INVENTOR.
JEROME H. LEMELSON

INVENTOR.
JEROME H. LEMELSON

INVENTOR.
JEROME H. LEMELSON

3,696,335

CREDIT VERIFICATION SYSTEM

This is a continuation-in-part of application Ser. No. 311,252 filed Sept. 24, 1963 for Magnetic Recording and Reproduction System now U.S. Pat. No. 3,511,940 having as a parent application Ser. No. 685,692 filed Sept. 23, 1957 now U.S. Pat. No. 3,106,612. This is also a continuation-in-part of Ser. No. 417,386 filed Dec. 10, 1964 for Record Card and Scanning Apparatus, now U.S. Pat. No. 3,434,130 having as a parent application Ser. No. 142,748 filed Aug. 28, 1961 for Computing Apparatus.

SUMMARY OF THE INVENTION

This invention relates to a credit verification and data entry system associated with business transactions such as the retail purchase of products and services. In particular, a preferred system employs cards such as credit cards containing visible information in the form of embossed alpha-numeric or numerical characters and machine readable coded information, the former used to impress character markings on a transaction slip after the latter information has been read and applied to obtain verification of the facts that the account has an acceptable credit standing and the account is in effect at the time it is read and, in certain instances, after the information has been used, to determine if the person presenting the card is the rightful owner thereof.

Credit card verification systems of the prior art have been varied from those employing printed lists of bad accounts which contain account numbers which are visually compared with the numbers of accounts printed on the credit card to more complex systems involving communication with a computer over telephone lines. However, employment of printed lists involves a time lag for obtaining information relating to bad accounts which time lag frequently results in failure to determine such accounts until substantial financial loss has been incurred. Communication with a computer by means of telephone lines is frequently costly and time-consuming, resulting from the time necessary to make the line connection. If the system requires a leased telephone line, the cost of such service may be substantial, particularly if a substantial number of credit verification stations or retail sales points are involved.

Accordingly, it is a primary object of this invention to provide a new and improved credit verification system for use in effecting business transactions such as retail sales on credit.

Another object is to provide a credit verification system which is automatically operative to verify the status of credit accounts in a short time interval, without resort to telephone line communication with a central recorder or computer.

Another object is to provide a credit verification system employing automatic means for distributing credit information from a computer to a plurality of recorders which provide local access to said information without the necessity of direct communication with the computer each time information is required.

Another object is to provide a credit verification system having the characteristic that local information on bad credit accounts may be made available on an immediate basis, if necessary.

Another object is to provide a credit verification and data entry system employing a recorder for credit information and means for utilizing the same recorder for recording business transactions after obtaining credit verification of accounts therefrom.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 2:
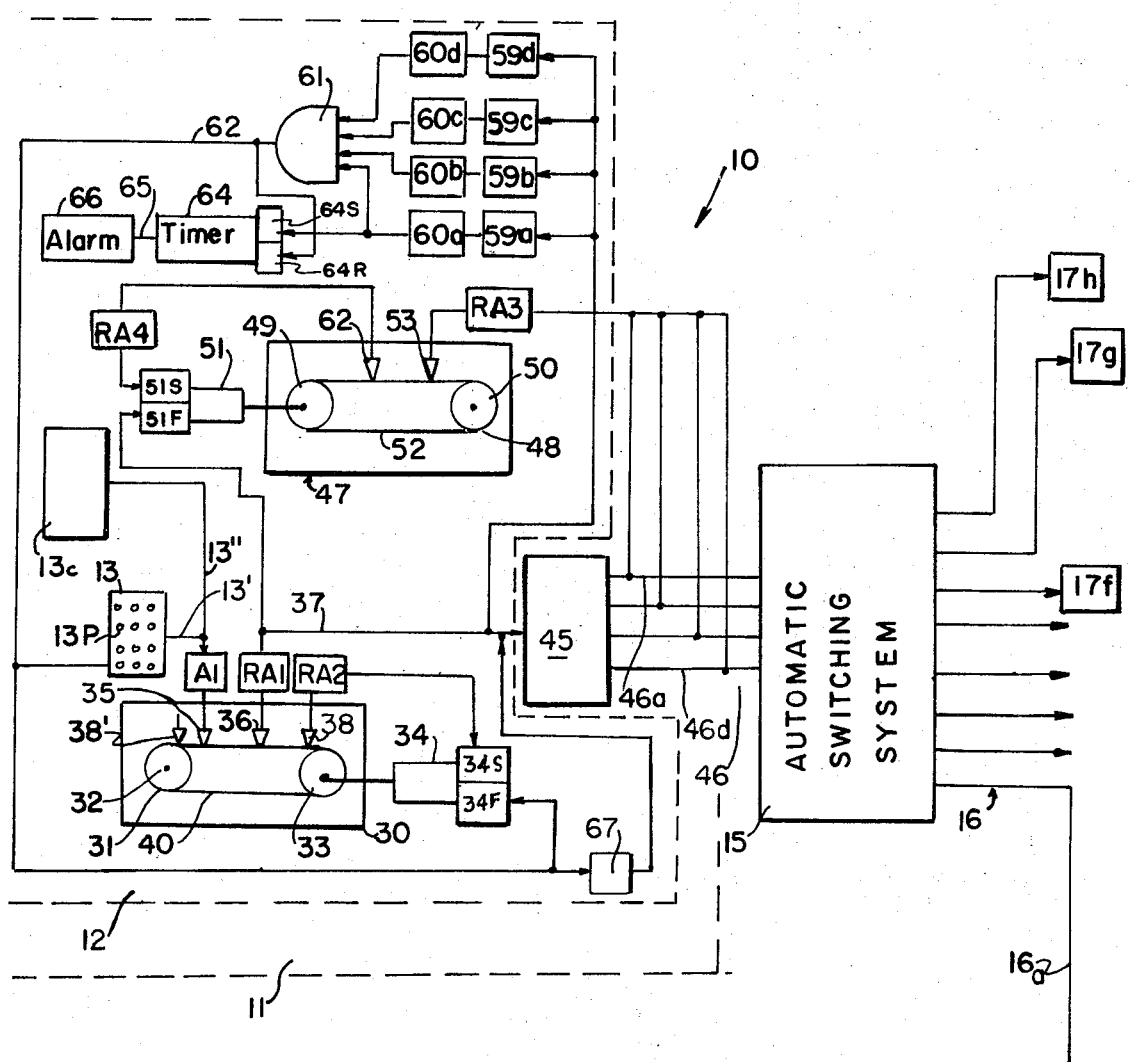
Figure 2:
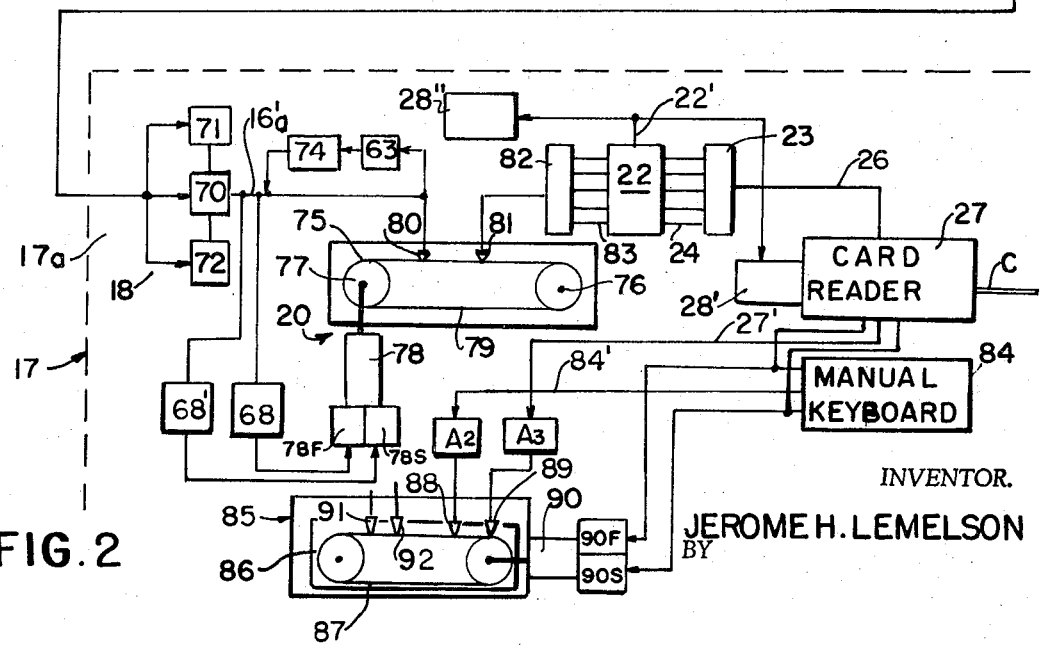
Figure 3:
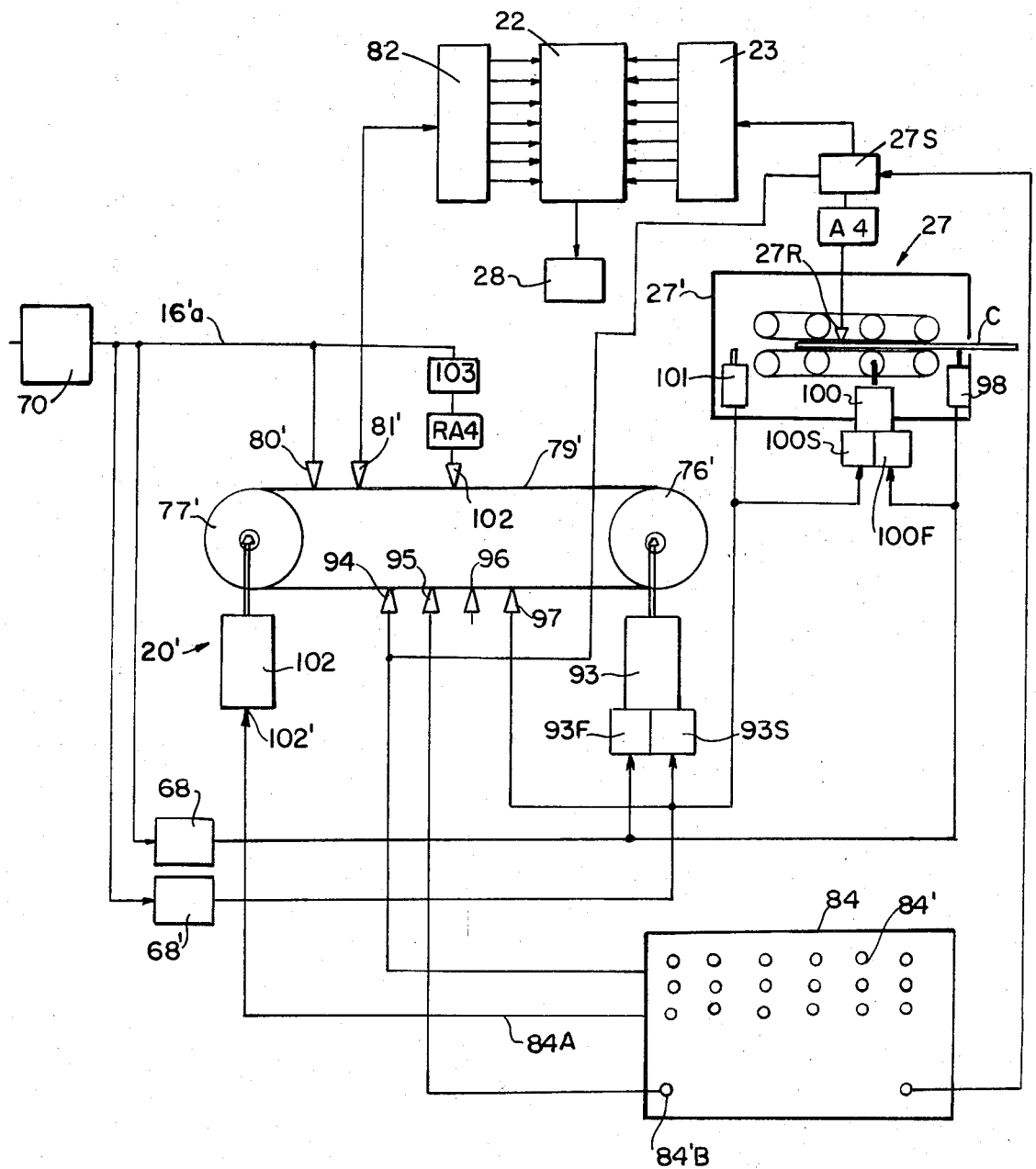

In the drawings:

FIG. 1 is a schematic block diagram of a credit verification and transaction data recording system defining the instant invention; and FIG. 2 is a more detailed schematic diagram of the credit verification system of FIG. 1, and FIG. 3 is a schematic diagram illustrating a particular modified form of the invention.

FIG. 1 is a block diagram illustrating the sub-system components of the card verification and data entry system. The system, designated 10, is particularly applicable for verifying the credit status of subscribers to a credit card service who purchase products and services on credit by presenting credit cards to clerical personnel trading in said products and services. If the cost of such goods and services is generally above a minimum amount, say $5 to $25, it is desirous to ascertain or verify if the account has an acceptable credit standing and if the person presenting the card for the goods and services is actually the owner of the card or is qualified to represent the owner and use the card.

The system 10 is composed of a central data processing station 11, preferably having a computer or recorder transmitter 12, of the type provided in my copending application Ser. No. 311,252 filed Sept. 24, 1963, or the like and a plurality of remote subscriber stations, one of which 17 is illustrated and contains the following card reading and verifying apparatus which is also provided at each of the other subscriber stations. Each subscriber station 17 has its own local recorder 20 for recording and reproducing code signals received from the central station 11 and representing, for example, all those accounts in the system pertaining to subscribers or card holders who have overdrawn their maximum allowed credit amount of have been discredited because of their failure to pay previous bills or accounts for which the credit cards have been lost or stolen. Each subscriber station 17 also contains one or more card readers 27 operative to read signals representing account numbers recorded on the cards presented to it. The reader may be made in accordance with the teachings of U.S. Pat. No. 3,434,130 entitled Record Card Scanning Apparatus. Reader 27 may also contain means for generating signals representative of variable data such as data representing products or services purchased, as provided in U.S. Pat. No. 3,434,130 and for a reading device capable of performing multiple printing and variable data generating functions applicable to such a unit.

The card reading unit 27 contains means for receiving and prepositioning a credit card and reading coded information recorded on a selected area or track of the card. Such reading is operative to generate a parallel or series code such as a binary digital code representative of the account number of the card owner. If the code generated is a series code which is generated on the output 26 of the reader 27 which is connected to a series-to-parallel code converter 23, said converter generates and holds said code in parallel on its plural outputs 24 which are connected to a comparator or code-matching relay 22. The code-matching relay 22 is a comparator which may be made in accordance with the teachings of my U.S. Pat. No. 3,051,777 and other U.S. patents such as U.S. Pat. No. 3,217,293 and No. 2,965,720. The comparator 22 is operative to receive on a plurality of other inputs 21 all the parallel codes reproduced from the recorder or computer 20 while the parallel code generated in reproducing information from the card by reader 27 is maintained on the inputs 24 thereto. If one of the codes reproduced from the recorder 20 matches or is the same as the parallel code held on inputs 24, comparator 22 is operative to generate a signal indicating such condition on its output 22' which is connected to a relay forming part of a visual indicator 28 or other form of means for visually or otherwise indicating such condition to prevent the use of the card to complete the transaction.

The system illustrated in FIG. 1 also provides means for automatically changing or updating the information recorded in the computer 20 of the subscriber stations by automatically effecting connections between a plurality of outputs 14, designated 14a to 14e, of the central data station computer 12 by means of an automatic telephone line switching system 15 having outputs 16 connected to the terminal circuits of stations 17. Such automatic connecting may be effected by an automatic signal generator at regular time intervals or in response to information entered into the recorder or computer 12, by a manual keyboard 13, or other suitable means. An input control means 18 for each subscriber station 17 for controlling the gating of information transmitted from the central data processing station to the recording input 19 of the local recorder 20 is provided connected to terminal circuit 17.

FIG. 2 is a schematic diagram showing further details of the credit verification system 10. The recorder-transmitter 12 at the central data processing station 11 includes a first memory unit in the form of a magnetic recorder 30 having a magnetic recording tape 40 drivable back and forth or in an endless path on a transport 31 illustrated as comprised of two drums 32 and 33. The latter drum 33 is shown as power rotated by a constant speed gear motor 34 to drive the tape 40 past a plurality of recording and reproducing transducers. The start and stop control 34F and 34S for motor 34 may be manually or automatically operated to effect the updating of recorded information and the playback of the recordings on the belt after suitable circuits have been established with a plurality of local verification stations 17 through the automatic telephone switching and connection system 15. Other forms of digital code recording and playback means may also be provided in place of the tape recorder 30 such as magnetic disc or drum recorders, mass memory matrices or the like, capable of generating trains of code signals representative of discredited accounts.

The system 10 is operative to permit the simultaneous transmission of codes of all discredited account numbers reproduced from recordings on the tape 40 to a plurality of receiving stations 17 each containing a local magnetic recorder and reproduction unit 20 which is of conventional design such as provided in serial number 311,252. The recorder-playback unit 20 provides discredited account number signals when queried after the reading of the account number recording on a card by a card reader 27 at the verification station 17. The recorder 30 has a recording head 35 for recording series binary codes representative of discredited accounts on a track of the tape 40, a pick-up head 36 for reproducing the recordings made through head 35 and an erase head 38' which is automatically operative during the recording operation by conventional means for erasing recordings to permit their replacement with updated recordings. The recording head 35 is operatively connected to a recording amplifier A1 which is connected to the output 13' of a manual key operated code generator 13 operative for selectively erasing and adding code recordings. Amplifier A1 is also connected to an output 13" of a data processing unit such as a computer 13C or card reader of the type shown in U.S. Pat. No. 3,434,130 operative to generate code signals representative of discredited accounts.

When it is desired to update or change the recordings of discredited accounts provided in the local recording units 20 of the remote credit verifying station, connection between the output of the reproduction amplifier RA for the magnetic pick-up head 36 and a plurality of receiving stations 17 is first made by transmitting switching signals to the automatic telephone switching and connection system 15 to which the inputs 16 to said credit verifying stations are connected.

In FIG. 2, the output 37 of the reproduction amplifier $RA^1$ is connected to a switching matrix 45 having a plurality of branch output circuits denoted 46a to 46d which are each connected to a respective line circuit extending directly to the automatic telephone system 15. The output circuits 46a to 46d are each connectable to any of the terminals 16 of the telephone system, which terminal lines are connected to respective of the verification stations 17a to 17d. Connection of the data processing station 11 with the verification stations is effected by generating the selection and connection codes or tones on the phone line circuits 46a to 46d. In the system provided in FIG. 2, such codes or tones are generated as reproduced from a magnetic recorder 47, although other types of signal generating means may also be provided. The recorder 47 has an endless loop magnetic tape 52 containing the selection and connection signals recorded in series along the tape. The tape 52 is driven on a tape transport 48 composed of a drum 49 driven by a constant speed gear-motor 51 and an idler drum 50. A first reproduction transducer 53 rides on a first track of the tape 52 containing groups of the connection signals representing the numbers to be called for all the telephone terminal circuits of all the verification stations 17 serviced by the central data processing station 11. A second magnetic pick-up transducer 62 reproduces control signals from another track of the tape, such control signals being operative to stop the motor 51 driving the tape each time after the number of terminal circuit selection and connection signals necessary to effect desired connections have been reproduced and applied to connect said output circuits to respective verification stations. While the output circuits 46 may be as many as 20 or 30 in number, if they are four in number, as illustrated, the tape 52 will have groups of four terminal circuit connection codes or tones recorded to be reproduced together to effect four circuit connections on which the account code signals may be simultaneously transmitted.

Thus, provided on tape 52 between each of said groups of four station connection codes are pulse signals adapted to be reproduced by head 62 and applied to the stop control 51S of tape drive motor 51. Thus, after each group of four tones or codes is reproduced by pick-up 53, tape drive motor 51 is stopped and remains stopped so that the next group of four codes will not be reproduced until after magnetic recorder 30 has completely cycled and reproduced all its account signals. Pick-up head 38 riding on a control track of tape 40 reproduces a pulse signal from a recording reproduced after all the account signals have been reproduced. Said pulse signal is applied to energize the stop control 34S of drive motor 34 and to start control 51F of drive motor 51 of circuit selection code recorder 47 to initiate generation of the next group of four circuit selection signals after a control signal has been generated as the result of effecting all four terminating circuit connections.

Means are also provided in the system of FIG. 2 to prevent the reproduction and transmission of the discredited account signals until all four terminal circuit connections have been made. To describe this prevention means, reference is made to the verification station 17a wherein controls are illustrated which include an input control 18 including a ring signal responsive relay 71 operative to close terminal circuit input switch 70 upon generation of the conventional telephone ring signal by the automatic switching system 15 on the line 16a therefrom. A second tone responsive relay 63 in the terminal circuit 16a for station 17a is responsive to a tone signal reproduced from tape 40 by head 36 after all of the switching and connection signals have been generated. The relay 63 operates to activate a tone generator 74 which generates a tone signal on the connected telephone circuit which signal is transmitted back to the terminal line 37 of the central station 11 and is applied to activate a tone responsive relay 59a which in turn activates a holding relay 60a closing a switch therein and gating electrical energy to a first input of an AND circuit 61. Each of the other receiving stations 17b, 17c and 17d contain similar tone responsive, tone generating means for activating respective tone relays 59b, 59c and 59d which activate holding relays 60b, 60c and 60d. When all the holding relays 60 are activated, the AND circuit 61 generates a control signal on its output 62 which control signal is applied to the start control 34F of motor 34 for initiating cyclic operation of recorder 30.

A timer 64 is utilized to indicate if any of the four terminal circuits of the local verification stations 17a to 17d have not been completed. The timer 64 generates a signal on its output 65 for activating an alarm 66 such as a light or buzzer if its reset input 64R is not pulsed by the signal generated on the output 62 of AND circuit 61 within a predetermined time interval after the first tone responsive relay 59a is activated. The outputs of relays 60a to 60d are also connected to the initiating input 64S of timer 64. The time constant of timer 64 is sufficient to allow all four circuits to the local verification station 17a to 17d to be completed under normal operating conditions. The outputs of each of the tone controlled relays 60a to 60d may also be connected (not shown) to respective switches for operating electric lights to indicate to personnel at the data processing station 11 which of the circuits have not been completed. A character indicating visual display means for each circuit may also be employed activated by the call signals reproduced from tape 52 for visually indicating the call number of that terminal circuit or circuits which have not been connected so that operating personnel may note same or attempt to manually effect connection of the circuit or circuits which have not been automatically connected by means of a conventional telephone dial or push-button signal generator connected to that terminal circuit of the lines denoted 46a to 46d in FIG. 2.

The output of AND circuit 61 is also applied to a tone generator 67 connected to the terminal line 37 of the master signal generating station 11 which tone generator 67, upon receiving said signal from AND circuit 61, generates a control tone signal which is transmitted simultaneously to all the subscriber stations 17 connected, as described, to line 37. Each of the subscriber stations 17 has a tone responsive relay 68 connected to the terminal line 16' thereof. The relay 68 is operative, upon becoming activated by receipt of said tone signal, to energize a start-control 78F of the motor 78 which drives the tape transport 79 of the subscriber's recorder 20 so as to effect the recording of the account signals reproduced thereafter from the record member 40 of the recorder 30. Once recorder 30 has been initiated in its operation, after all terminal circuits to the verification stations 17 have been completed, said recorder goes through a complete cycle by reproducing all signals recorded on the tape 40 which are transmitted to all receiving stations and are recorded by means of the magnetic recording transducers 80 coupled to the tapes 79 of the recorders 20 of said verification stations. After all code signals are reproduced and transmitted, an end-of-recording signal on an adjacent track of tape 40 is reproduced by a pick-up head 38 and is applied both to the stop control 34S of motor 34 and as a tone signal as generated from a tone signal recording on a separate track of tape 40. Pick-up head 38 is connected to the output line 37 permitting transmission of said tone to all the subscriber station terminal circuits. Said received second tone signal is operative to energize a second tone responsive relay 68' contained in each of the subscriber terminal circuits. Said second tone responsive relay activates the stop-control 78S of motor 78 to terminate operation of the recorder 20 after all account signals have been transmitted thereto from the master transmitting station 11.

If conventional telephone lines are employed to transmit discredited account signals, as described, to the verifications station, such transmission is preferably effected at night-time, when line use is at a minimum.

Thus, updating of credit information may be effected each night or at any desired time when such updating is necessitated. After the recorder 20 of the verification station 17 has received and recorded all signals reproduced from the recorder 30 of the master transmitting station 11, local credit verification functions may be initiated. Such credit verification may be effected by inserting a card C into the verifier-reader unit 27, which generates a series code which is transmitted to a series-to-parallel converter 23 operative to hold said code in parallel array on the parallel outputs 34 thereof, which are connected to a comparator circuit 22. The comparator 22 also receives parallel codes generated on lines 83 extending from a series-to-parallel converter 82, which is connected to the code pick-up head 81 riding on the tape 79 of the recorder 20. If a code reproduced from tape 79 matches the code held on inputs 24, the comparator or code-matching relay 22 is operative to generate a control signal on its output 22' which is shown in FIG. 2 as being connected to a servo device 28', such as a motor or solenoid which operates, when so activated, to hold, mark, punch or otherwise affect the card inserted into the reader. The output 22' is also shown extending to an alarm device 28" operative to warn the clerk utilizing the credit verification sub-system at the subscriber station 17 of the discredited account condition.

FIG. 2 also illustrates a keyboard signal generator 84 which is provided adjacent to or is located within the housing in which the card reader 27 is located. Unit 84 contains one or more means for entering and recording variable data associated with each transaction as signals on a magnetic tape 87 driven in a magnetic recorder 85. The tape 87 is provided in a magazine or cartridge 86 which is operatively inserted into the recorder 85 and is driven by means of a motor 90 forming part of the recorder. The signal-generating device 84 includes manually operated switches for operating the stop and start-controls 90S and 90F of the motor 90 driving the tape 87 for recording thereon. The signal-generator 84 may comprise a keyboard containing a plurality of manually operated push-buttons for generating code or tone signals representative of variables associated with the transaction effected by means of the verified credit card C, such as the number of pieces purchased, catalog number, etc. Said information is generated as series code signals on the output 84' of device 84 and is transmitted to a recording amplifier A2 which is connected to a recording head 88 operatively located with respect to the tape 87. An output 27' of the card reader extends from a reproduction head scanning a record track of the card containing recordings representative of the account number of the card holder. Line 27' extends to a recording amplifier A3 which is connected to a second recording head 89 operatively located to transduce the signals generated on line 27' on a second track of the tape 87. Notations 91 and 92 refer to magnetic reproduction heads located in the recorder 85 for reproducing those signals recorded by heads 88 and 89. Control means, not shown, are provided in recorder 85 for reproducing the recorded signals and generating tone representations of said signals which may be transmitted on a telephone circuit, such as the circuit composed of line 16a and 46a to the station 11 which signals are applied to a tone-responsive relay (not shown) which is operative to automatically record the codes representative of said tone signals on still another recorder or present same to a computer for recording and accounting for the accredited transaction. The cartridge or magazine 86 containing the tape 87 with a plurality of transaction recordings effected by the clerk may also be manually or otherwise delivered to a master transmitter located in the store defined by the station 17 for transmission to the central computer located at station 11 or any other location, so as to provide automatic means for the transmission of transaction information to a computer for processing.

Device 28" may also represent a printer for transaction sheets of paper inserted therein with the credit card and having a roller platen operated by hand or a motor to bring the card and sheet together to print characters of the raised embossings of the card on one or more paper sheets. If the device 28" is electric motor operated, the output 22' of comparator 22 may be connected to the switching input of a normally closed switch enabling operation of the motor driving the platen. The signal generated on the comparator output 22' when the account is unverified may also be utilized to activate a solenoid or motor for preventing removal of the card from the printer housing.

It is also noted that the card reader 27 may contain means for printing characters of the raised embossings of a card inserted into said reader onto one or more transasction slips of paper to be used as a receipt by the card holder and employing a roller platen of conventional design operative to impress the moving card against a moving sheet of paper or operative when the card is held stationery within the housing of said reader. The described platen motor disenabling means and card holding means connected to the output 22' of comparator 22 may also be provided therein.

It is noted that the two recorders 20 and 85 of FIG. 2, which are respectively provided at the credit verification station for recording credit information and business transactions, may be replaced by a single-recording unit for performing both functions. FIG. 3 illustrates such a single-recording unit applicable to the credit verification station 17 and containing many of the components illustrated in FIG. 2. The single recorder 20' contains an endless magnetic tape or belt 79' driven about a transport composed of reels or drums 76' and 77' by a motor 93 having start and stop controls denoted 93 F and 93S. In the credit verification mode, a card C is inserted into the card reader 27 and a transducer 27R reads information recorded on the card and representative of the card account. The output of transducer 27R is a series code which is transmitted to the described series-to-parallel converter 23 and held in relay storage therein. As the card C enters the housing 27' of the reader 27, it operates a first limit switch 98 which activates the start control 100F of a motor 100 driving the card through the housing. The limit switch 98 also gates power to pulse the start control 93F of the motor 93 driving the endless record member 79' so as to permit the reproduction head 81' to reproduce the signals recorded on tape 79' which are indicative of unverified accounts and to transmit said signals to the series-to-parallel converter 82 which, in turn, generates all the verification codes recorded on tape 79' in parallel form at comparator 22 for their comparison with the parallel code signals held on the outputs of converter 23.

If the account represented by the card read in reader 27 is verified, the operator of the apparatus may next perform operations to affect the recording of a transaction on a separate channel of the magnetic tape 79'.

A number of techniques may be employed to position tape 79' with respect to a code recording head 94 operative to record the transaction. The code generating outputs of card reader 27 and manual keyboard 84 are connected to transaction code signal recording head 94 for recording the signals generated by the two devices on a transaction signal recording channel of tape 79' which is different from the channel or channels containing the recorded verification signals. A number of techniques may be employed to position tape 79' so that the next unrecorded portion of the channel against which head 94 rides is in alignment with said head after the tape has completely cycled one time and all of the credit verification signals have been reproduced therefrom. In its simplest form, such control may be effected by means of a timer operative to stop the motor 93 driving tape 79' in its endless path at a timed interval after it has started such that the entire endless tape has passed the heads of the recorder 20'. In FIG. 3, the means utilized to stop the tape 79' so that the next unrecorded portion of the channel on which transaction recordings are transcribed is in alignment with head 94, comprises recording a control signal on a separate control channel of the tape. The control signal is recorded by the operator at the end of the recordings of the previous transaction when he depresses a key 84'B of the keyboard 84 terminating said transaction. Said key 84'B is a mono-stable switch which gates a pulse to a recording head 95 riding on the control signal channel of tape 79'. The signal recorded by head 95 is reproduced by a pickup 97 riding on the same channel and is transmitted as a pulse to the stop control 93S of motor 93, which contains means for predeterminately stopping said motor so that the next unrecorded portion of the transaction signal recording channel is in alignment with recording head 94. A permanent magnetic erase head 96 is positioned with respect to the channel of the tape scanned by heads 95 and 97 and operates to erase the control signal recording effected by recording head 95 after said signal recording has been reproduced by head 97 and utilized to stop motor 93. The operator then effects the recording of a transaction by either entering the card holder's identification number and variable information associated with the transaction by selectively operating the keys 84' of the keyboard 84 or by a combination of feeding card C through the reader 27 to generate the subscriber's identification signals recorded thereon and selectively operating keys 84' to generate said variable information thereafter. Accordingly, a bi-stable switch 27S is provided in the output of amplifier A4 for the signals reproduced by scanning transducer 27R which, when said bi-stable switch is operated by a manual key on keyboard 84 gates the output of 84 to the recording head 94, so that when the card C is next driven through the housing 27, the series signals generated in reading the card will be recorded on the transaction channel of tape 79'. Thereafter, as described, the operator depresses selected keys of the keyboard 84 to generate signals in code or tone form which are indicative of variable information relative to the transaction such as date, code associated with the article purchased, number of articles purchased, etc.

While the transaction signals may be recorded while the tape 79 is driven at a constant speed, it is preferable to record each signal or group of signals while the tape is driven in a stepping mode, so as to eliminate variable delays in recording due to variations in the time the operator takes to punch the keys 84'. Accordingly, a stepping motor 102 is provided to drive the tape 79' in a stepping mode. While motor 102 is shown operatively connected to drum 77' while the shaft of motor 93 operates in a free-wheeling mode, said motor 102 may also be operatively coupled to the same shaft driven by motor 93 which same shaft may be utilized to drive either of the drums or a capstan drive unit engaging the tape together with either or both drums, so that the tape may be properly driven either in a constant high-speed mode during reproduction of the credit verification signals therefrom or in a stepping mode during the recording of transaction signals.

An output 84A of the keyboard 84 extends to the input 102' of stepping motor 102 and is energized to cause motor 102 to step each time any key-operated switch 84' of the keyboard 84 is depressed, so that the recording signal or signals generated by said switch will be passed to the recording heads 94 or 95 while the tape is in motion.

During the operation of automatically recording signals of unverified account numbers on tape 79', which function may be effected during a given time interval or at nighttime when the verification station is not in use, the described tone-responsive control switches 68'' and 68 are activated to respectively stop and start motor 93 driving tape 79' for recording purposes.

For the purpose of simplifying the drawings described, block diagram notations have been utilized to signify relays, switches, amplifiers, logical switching circuits, motors and their controls, as well as subsystems which are illustrated in greater detail in my parent application set forth herein. Power supplies for these components have not been included so as to simplify the drawings and it is assumed that they are provided on the correct sides of all switches, relays, amplifiers, motors, controls and logical circuits so as to effect proper and suitable operation as described. Notations RA–1 to RA–5 refer to reproduction amplifiers for signals generated in scanning recordings on magnetic tape. In certain instances, recording and reproduction amplifiers have been eliminated from the drawings and it is assumed that they are utilized where needed.

It has been previously defined that the signals recorded locally at each verification station and representative of business transactions may comprise combinations of signals generated by card reader 27 reading a card and signals generated by selective operation of the described code generating keyboard switches, which recorded signals may be reproduced and transmitted to the master accounting or central data processing station 11 and recorded in a magnetic recorder or computer thereat. Such reproduction and transmission of local account signal information may be automatically effected during or immediately after an automatic connection has been made, as described, between the central data processing station 11 and the verification station by providing suitable controls for the recorder at the verification station and generating suitable control signals at said central station and transmitting same on the connected line. In the arrangement illustrated in FIG. 3 the recorder 20' is controlled to start and stop as described by signals transmitted on the connected line from the central or master station which signals may be specific tone signals to which the tone responsive relays 68 and 68' are responsive for energizing the start and stop controls 93F and 93S of the tape drive motor 93. A reproduction head 102 riding against the same channel engaged by recording head 94 reproduces the card generated account information and variable signal information generated by keyboard 84 as pulse signals and applies said pulse signals to a tone generator 103 connected to the reproduction amplifier RA5 thereof. The output of tone generator 103 is connected to the terminal circuit 16'a and the tones generated thereby are transmitted back to the master or central station connected thereto. A tone responsive relay (not shown) at said master station is connected to receive and be activated by the tones generated by generator 103 and is operative to generate corresponding signals each time it is so activated on the imput of a magnetic recorder for recording the information reproduced by head 102. The above described operation of generating, transmitting and recording transaction information may be effected simultaneously as signals representative of unverified accounts are transmitted to the verification station or prior to or after the transmission of said verification signals. The operation is preferably effected during one cycle of the magnetic tape past all heads and erasure of the accounting signals from the record channel scanned by head 102 may be automatically effected by a permanent magnetic erase head located downstream of head 102 or by an erase head activated by signals transmitted from the master station.

Thus it is seen that if a single recorder-reproduction unit such as 20' is utilized for the purposes described, it may be employed to periodically and automatically update credit information and automatically transmit transaction information to a computer at a central processing master station.

Separate recording units for credit and transaction information may also be utilized as shown in FIG. 2 and may be operated simultaneously by means of suitable tone responsive relays and controls to effect the simultaneous recording of credit information and reproduction of accounting information. The endless belt recorders described may be replaced by suitable magnetic disc, drum or card recording and reproduction units.

It is also noted that the described local memory in which credit information is stored for comparison with the information derived in reading cards may be accessible to a number of sales or credit verification stations such as the sales locations of a single store or group of stores having line access thereto. A recorder 20 of the type shown in FIG. 2 may be operated continuously in the playback mode to constantly generate discredited account signals on a plurality of output lines each extending to a separate comparator unit associated with a sales transaction station or credit check station.

The described magnetic recorders may also be replaced with other forms of erasable or updatable recording means. For example erasable mass memory matrices may be employed wherein account signal comparison with discredited account signals recorded therein may be effect almost instantaneously. Thus where ever the term local recorder is employed, it is assumed that it may comprise a magnetic tape, disc, belt or drum recorder or other form of recorder or memory having signals representative of discredited or accredited accounts if the latter are employed for verification purposes.

The system described may also be applicable for verifying or checking information other than that associated with credit such as security information, membership information and perhaps even information associated with legal matters.

I claim:

1. A system for verifying and updating the status of accounts such as credit card accounts each defined by a card containing readable account-identifying information, said system comprising:

a master accounting station including recording means for recording and updating information with respect to specific accounts, a plurality of account verification stations remote from said master accounting station for reading the account-identifying information recorded on a card and generating codes representative of the account numbers of cards read thereby, each of said account verification stations having a local recorder for information representative of specific account numbers, an automatic switching and connection communication system, means for periodically reading the information recorded by said master recording means at said master accounting station and generating codes representative of the accounts recorded thereby, means for automatically connecting the output of said reading means with a plurality of said recorders of said account verification stations and means for transmitting the codes generated in reading said master recording means to said recorders of said account verification stations, means for recording said codes in each of said recorders, means operative upon the reading of card identifying information from a card presented to the card reading means of each station for reading all the account identifying codes recorded in its local recorder, comparator means at each verification station operatively connected to receive code signals generated by the card reading means of said station and code signals generated in reading the account-identifying codes of the local recorder, said comparator means being operative to generate a signal when the code generated in reading a card matches a code reproduced from said local recorder and means operatively connected to said comparator means responsive to said signal generated thereby to indicate that said signal has been generated.

2. A system in accordance with claim 1, including input means to said master recording means for recording signals representative of bad accounts and means for controlling said means for reading said master recording means to read only those codes recorded since the last reading operation and transmitting said read codes to said plurality of account verification stations.

3. A system in accordance with claim 2, including means for recording codes in said master recording means which codes are representative of accounts to be reinstated, and control means at each of said verifying stations for effecting erasure of those codes recorded in its recorder which are received thereby and are representative of said accounts to be reinstated.

4. A system in accordance with claim 1, including means for printing a transaction slip with the information contained on a card and means for disenabling said printing means to prevent the printing operation, said disenabling means being operatively connected to said comparator means and including means operative in response to a signal generated by said comparator means for preventing the printing of information contained on a card and the completion of a transaction by said printing means.

5. A system in accordance with claim 1 whereby said automatic connecting means comprises an automatic telephone switching and connection system having a plurality of circuits for transmitting said codes generated in reading said master recording means to said account verification stations, and means at said master accounting station for generating signals for automatically controlling the operation of said automatic telephone switching system to connect the output of said reading means of said master accounting station with a plurality of said verification stations prior to the reproduction of codes from said master recording means.

6. A system in accordance with claim 1 including means for connecting the output of said master station with a plurality of verification stations whereby the codes generated in reading said master recording means may be simultaneously transmitted to said plurality of verification stations and simultaneously recorded in each of the local recording means thereof.

7. A system in accordance with claim 6 including means at said master station for indicating when connections have been made with said plurality of verification stations, said indicating means including signal generating means and control means responsive to said signal generated by said signal generating means for controlling the reading of information from said master recording means when said indicating signal is generated.

8. A system in accordance with claim 1 including means at said verification stations for generating signals representative of variable data representing transactions and means for transmitting said variable data signals to said master accounting station when a connection is made between the two stations, and means at said master accounting station for recording signals transmitted thereto from each verification station.

9. A system in accordance with claim 8, said means for generating said variable data signals comprising a recorder at each verification station, variable signal generating input means to each recorder including a keyboard having a plurality of key operated switches for generating variable information and recording said information as code signals in its recorder and control means operative in response to signals generated at said master accounting station for effecting the reading of information recorded in said verification station recorder and its transmission to said master accounting station.

10. A system in accordance with claim 1 including means at each of said verification stations for effecting the local recording of information in each of said verification recorders and comprising a keyboard for recording variable information therein.

11. A system for verifying and updating the status of accounts such as credit card accounts each defined by a card containing readable account-identifying information, said system comprising:

a master accounting station including recording means for recording and updating information with respect to specific accounts, a plurality of account verification stations remote from said master accounting station for reading the account-identifying information recorded on a card and generating codes representative of the account numbers of cards read thereby, each of said account verification stations having a local recorder for information representative of specific account numbers, an automatic communication system operable for the automatic transmission of information from said master accounting station to said plurality of account verification stations, means for periodically reading the information recorded at said master accounting station and generating codes representative of the accounts recorded thereby, means for automatically coupling the output of said reading means of said master accounting station with a plurality of said recorders of said account verification stations and means for transmitting the codes generated in reading the recordings of said master accounting station to said recorders of said account verification stations, means for recording said codes in each of said recorders, means operative upon the reading of card identifying information from a card presented to the card reading means of each account verification station for reading all the account identifying codes recorded in its local recorder, comparator means at each verification station operatively connected to receive code signal generated by the card reading means of the station and and code signals generated in reading the accoutn-identifying codes of the local recorder, said comparator means being operative to generate a signal when the code generated in reading a card matches a code reproduced from said local recorder and means operatively connected to said comparator means responsive to said signal generated thereby to indicate that said signal has been generated.

* * * * *